(12) United States Patent
Cao et al.

(10) Patent No.: US 9,449,627 B2
(45) Date of Patent: Sep. 20, 2016

(54) ANGLED WAVEGUIDE

(71) Applicant: Seagate Technology LLC, Cupertino, CA (US)

(72) Inventors: Lina Cao, Bloomington, MN (US); Chubing Peng, Eden Prairie, MN (US); Werner Scholz, Camberwell (AU); Pierre Asselin, Richfield, MN (US); Tae-Woo Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/955,373

(22) Filed: Dec. 1, 2015

(65) Prior Publication Data
US 2016/0163341 A1    Jun. 9, 2016

Related U.S. Application Data

(60) Provisional application No. 62/089,546, filed on Dec. 9, 2014.

(51) Int. Cl.
*G11B 11/00* (2006.01)
*G11B 7/135* (2012.01)
*G11B 5/48* (2006.01)
*G11B 5/00* (2006.01)

(52) U.S. Cl.
CPC ..... *G11B 5/4866* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 4,945,525 A | * | 7/1990 | Yamamoto | G11B 7/124 369/44.12 |
| 5,011,248 A | * | 4/1991 | Taki | G02B 6/12002 360/110 |
| 6,519,379 B1 | * | 2/2003 | Izawa | G02B 6/12002 369/44.12 |
| 7,440,660 B1 | * | 10/2008 | Jin | B82Y 10/00 369/112.27 |
| 8,243,561 B2 | | 8/2012 | Matsumoto | |
| 8,787,129 B1 | * | 7/2014 | Jin | G02B 6/105 369/13.13 |
| 2006/0005216 A1 | * | 1/2006 | Rausch | G11B 5/3133 720/659 |
| 2006/0233061 A1 | * | 10/2006 | Rausch | G11B 5/02 369/13.32 |
| 2008/0204916 A1 | * | 8/2008 | Matsumoto | G11B 5/314 360/59 |
| 2009/0185459 A1 | * | 7/2009 | Matsumoto | G11B 5/4826 369/13.02 |
| 2011/0002199 A1 | * | 1/2011 | Takayama | B82Y 20/00 369/13.24 |
| 2011/0170381 A1 | | 7/2011 | Matsumoto | |
| 2012/0044790 A1 | * | 2/2012 | Shimazawa | G11B 5/105 369/13.32 |
| 2013/0342885 A1 | * | 12/2013 | Kono | G02B 5/32 359/15 |
| 2014/0241137 A1 | | 8/2014 | Jin et al. | |

* cited by examiner

*Primary Examiner* — Peter Vincent Agustin
(74) *Attorney, Agent, or Firm* — Hollingsworth Davis, LLC (57) ABSTRACT

An apparatus has an input surface configured to receive energy emitted from an energy source in a first mode. A mode order converter is configured to convert the energy from the first mode to a second mode. The waveguide of the apparatus has an input end disposed proximate the input surface and configured to receive the energy in the first mode. The waveguide has an output end disposed proximate a media-facing surface and configured to deliver energy in the second mode. The output end is at an oblique angle to a cross-track line at an intersection of the media-facing surface and a substrate-parallel plane.

20 Claims, 8 Drawing Sheets

ANGLED WAVEGUIDE

RELATED PATENT DOCUMENT

This application claims the benefit of Provisional Patent Application Ser. No. 62/089,546 filed on Dec. 9, 2014, to which priority is claimed pursuant to 35 U.S.C. §119(e), and which is incorporated herein by reference in its entirety.

SUMMARY

An apparatus comprises an input region comprising an input surface configured to receive energy emitted from an energy source in a first mode, a mode order converter configured to convert the energy from the first mode to a second mode, and a waveguide. The waveguide comprises top and bottom cladding layers and a core disposed on a substrate-parallel plane therebetween, an input end disposed proximate the input surface and configured to receive the energy in the first mode, and an output end disposed proximate a media-facing surface and configured to deliver energy in the second mode. The output end is at a first oblique angle to a cross-track line at an intersection of the media-facing surface and the substrate-parallel plane. The apparatus further includes a near-field transducer located proximate the core and proximate the media-facing surface.

An apparatus according to another embodiment comprises an input region comprising an input surface configured to receive energy emitted from an energy source in a first mode, an output surface configured to deliver energy to a recording medium, and a mode order converter disposed between the input surface and the output surface and configured to convert the energy from the first mode to a second mode. The apparatus includes a waveguide comprising top and bottom cladding layers and a core disposed on a substrate-parallel plane therebetween, an input end disposed proximate the input surface and configured to receive the energy in the first mode, and an output end disposed proximate the output surface and configured to deliver energy in the second mode. The output end is at an oblique angle to a cross-track line at an intersection of the output surface and the substrate-parallel plane between the output surface and the mode converter. The apparatus further includes a near-field transducer proximate the core and proximate the output surface including an expanded portion and a peg. The near-field transducer is configured to receive energy in the second mode from the output end and the expanded portion is disposed at an oblique angle to a cross-track line at an intersection of the output surface and the substrate-parallel plane.

A further embodiment is directed to a method comprising emitting light in a first mode from a laser to an input surface of an input region of a recording head, receiving the light in the first mode with a first portion of a waveguide, and converting the light in the waveguide from the first mode to a second mode. The light in the second mode is guided to an output surface of the recording head via a second portion of the waveguide at an angle other than normal, the second portion of the waveguide being disposed at an oblique angle to a cross-track line at an intersection of the output surface and a substrate-parallel plane between the output surface and the mode converter. The method further includes delivering energy to heat a portion of a recording medium via the output surface.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

DETAILED DESCRIPTION

The present disclosure is generally related to the use of an angled waveguide (e.g., channel waveguide) that receives energy (e.g., light) from an energy source (e.g., laser diode) and delivers the energy to a recording medium (e.g., a heat-assisted, magnetic recording medium) at an angle other than normal to the output surface of a recording head. The waveguide is formed integrally within the recording head and additional recording head features (e.g., a near-field transducer) may also be formed at an angle. The laser diode may be attached to an outer surface of the recording head and direct its output to the waveguide at an angle approximately normal to the output surface of the recording head. The angle of the waveguide is selected to reduce reflection of the laser output from a recording medium and/or near-field transducer back to the laser diode. This reduction in reflection helps reduce laser instability issues.

A heat-assisted, magnetic recording (HAMR) data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

A HAMR read/write element, sometimes referred to as a slider or read/write head, includes magnetic read and write transducers similar to those on current hard drives. For example, data may be read by a magnetoresistive sensor that detects magnetic fluctuations of the moving medium. Data may be written to the magnetic medium by a write coil that is magnetically coupled to a write pole. A HAMR slider will also generally include a source of energy, such as a laser diode, and an optical delivery path through the slider that delivers the energy to the surface of the medium.

The optical delivery path of a HAMR slider may include a near-field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc. The NFT for a HAMR device is very small (e.g., on the order of 0.1$\lambda$, to 2$\lambda$, $\lambda$ denoting light wavelength for excitation) including a peg and an expanded portion and creates a localized region of high power density in the media through an electromagnetic interaction. This results in a high temperature rise in a small region on the media, with the region exceeding the Curie temperature having dimensions less than 100 nm.

A laser (or other energy source) may be separate from or attached to the HAMR slider. Configurations where a laser (e.g., edge-emitting or surface-emitting) is attached to the HAMR slider allows for parallel attachment of large numbers of lasers at once to a wafer of slider bodies, thereby reducing manufacturing costs. Depending on the orientation of the laser, light output of the laser may be parallel to the plane of the wafer to direct output energy at an angle approximately perpendicular, or normal, to the media-facing surface.

A light source such as an edge-emitting laser diode often has a fundamental, transverse electric mode, $TE_{00}$-like output beam profile. However, a phase-shifted higher-order mode, e.g., $TE_{10}$, is desired for coupling with some configurations of a plasmonic transducer. This desirability can be understood by comparing field intensity plots of respective $TE_{00}$ and $TE_{10}$ mode profiles before and after mode conversion. A fundamental $TE_{00}$ mode provides a single region of high intensity on a field intensity plot, whereas a higher-order mode, e.g., $TE_{10}$), yields dual regions of comparable area but at slightly less intensity. The light at the higher-order mode is directed to a plasmonic transducer that generates surface plasmons in response. The dual regions of light intensity at the higher-order mode provide more uniform coverage of the plasmonic transducer (e.g., NFT). The resulting surface plasmons are directed to heat a recording medium. This higher-order mode is generated in the slider with a mode converter disposed along the waveguide. The recording medium also reflects light back to the slider body, exciting both $TE_{00}$ and $TE_{10}$ mode in the waveguide. This reflected $TE_{10}$ light can cause laser instability when it propagates through the mode order converter, converting back to the $TE_{00}$ mode and returning to the laser diode light source. However, the reflected $TE_{00}$) mode gets lost and will not return back to the light source.

In embodiments described below, a waveguide is used to guide and direct energy from the laser diode to the recording medium. In reference to FIG. 1, a perspective view shows a HAMR slider assembly 100 according to an example embodiment. The slider assembly 100 includes an energy source 102 (e.g., laser diode) located on input surface 103 of a slider body 101. The energy source 102 delivers light to a region proximate a HAMR read/write head 106, which is located near a media-facing surface 108 of the slider body 101. The media-facing surface 108 faces and is held proximate to the moving medium surface during device operation. The media-facing surface 108 may be configured as an air-bearing surface (ABS) that maintains separation from the media surface via a thin layer of air.

Figure 1:
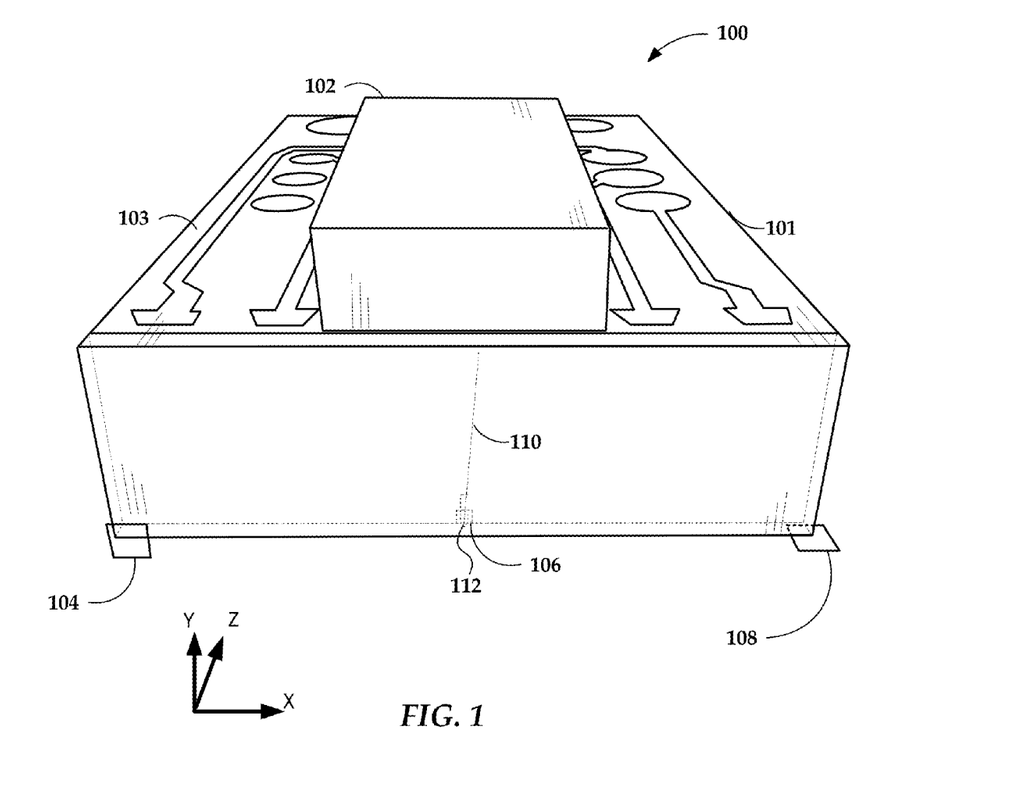
FIG. 1 is a perspective view of a slider assembly according to an example embodiment.

The slider assembly 100 tracks across the magnetic recording medium in the x-axis of FIG. 1, also referred to as the cross-track direction. Relative to the slider, the magnetic recording medium rotates in the orthogonal z-axis direction, referred to as the down-track direction. The edge of the slider that first passes over any position of the rotating recording medium in the down-track direction is referred to as the leading edge, and the edge of the slider that is last to pass over the position of the recording medium is referred to as the trailing edge, designated by plane 104. The magnetic recording head arrangement, with slider assembly 100, reads and/or writes bits to the rotating magnetic recording medium as the magnetic recording medium rotates relative to the slider.

The energy source 102 provides electromagnetic energy used to heat the recording medium as it passes by the read/write head 106. Optical coupling components, such as a waveguide 110, are formed integrally within the slider assembly 100 and form an optical path that delivers energy from the energy source 102 to the recording medium via a near-field transducer (NFT) 112. The laser light can be focused on the NFT 112 with a variety of optical elements such as a tapered optical waveguide or a parabolic mirror. The near-field transducer 112 is near the read/write head 106 and causes heating of the medium during recording operations.

In this example, the energy source is an edge-emitting laser that emits light from an elongated channel that has an output located near a corner edge of the laser. The edge-emitting laser is surface mounted on input surface 103 and emits light normal (or approximately so) to the input surface 103, e.g., along the y-direction. The waveguide 110 and variations thereof described herein may also be used with other types of laser diodes, such as vertical cavity, surface-emitting lasers (VCSELs). Generally, a VCSEL emits light in a direction perpendicular to a surface of the laser body. The energy source 102 may be mounted on a surface of the slider body 101 (or in a pocket or cavity). A surface-emitting or edge-emitting laser in any of these examples may be coupled to the slider body 101, or via a coupling component such as a submount (not shown).

The energy source 102 can be mounted external, or integral, to the magnetic recording head arrangement. While the example in FIG. 1 shows energy source 102 directly mounted to the slider assembly 100, the waveguide 110 discussed herein may be applicable to any type of light delivery configuration. For example, in a free-space light delivery configuration, a laser may be mounted externally to the slider, and coupled to the slider by way of optic fibers and/or waveguides. The slider in such an arrangement may include a coupling feature on an input surface 103 into which light is coupled and delivered to a waveguide 110 which propagates the light in a direction to energize the near-field transducer 112. As will be described in greater detail hereinbelow, the waveguide 110 facilitates directing light to the media-facing surface 108 at an angle other than normal in the cross-track (x-axis) direction of the media-facing surface 108.

Figure 2:
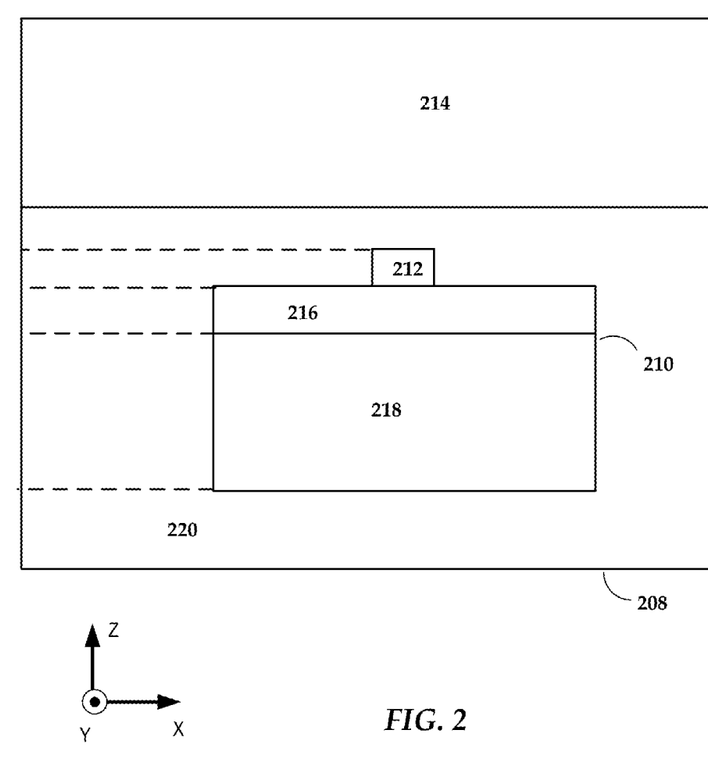
FIG. 2 is a block diagram of the media-facing surface of a slider assembly according to an example embodiment.

In reference now to FIG. 2, a block diagram of the media-facing surface of a slider assembly is illustrated. The illustrated portion of a media-facing surface 208 includes a write pole 214 proximate an NFT 212 and a waveguide 210.

The waveguide 210 includes a core layer 218 surrounded by one or more cladding layers 216, 220. The core layer 218 and cladding layers 216, 220 may be made from dielectric materials, which are selected so that the refractive index of the core layer 218 is higher than refractive indices of the cladding layers 216, 220. Example dielectric materials having a high index of refraction for the waveguide core 218 include, $Ta_2O_5$ (tantalum oxide), $TiO_2$ (titanium oxide), $Nb_2O_5$ (niobium oxide), $SiN_x$ (silicon nitride, including $Si_3N_4$), SiC (silicon carbon), $Y_2O_3$ (yttrium oxide), $Hf_2O_3$ (hafnium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers 216, 220 are each formed of a dielectric material having a refractive index lower than that of the core; such materials may include $Al_2O_3$ (aluminum oxide), SiO (silicon oxide), $SiO_2$ (silica), $SiO_xN_y$ (silicon oxynitride), and AlN (aluminum nitride). The higher refractive index of the waveguide core facilitates efficient propagation of energy, e.g., light, through the waveguide 210. For example, core layer 218 may comprise $Ta_2O_5$, while cladding layer 216 may comprise $Al_2O_3$, and cladding layer 220 may comprise $SiO_2$.

The hidden (dashed) lines of FIG. 2 illustrate that at least the core layer 218 and cladding layer 216 of waveguide 210 are disposed at an oblique angle at the media-facing surface 208. While the waveguide 210 is tilted with respect to the media-facing surface, the end portion of the waveguide 210 is flush with the media-facing surface as illustrated by the rectangular cross-section.

Other features illustrated at the media-facing surface 208 include the write pole 214 and the NFT 212. The write pole 214 is shown without separately illustrating a heat sink (e.g., Cr heat sink) for simplicity of the figure. The portion of the NFT 212 shown at the media-facing surface 208 is a cross-section of a peg of the NFT 212. However, the peg of the NFT 212 can optionally also be disposed at an oblique angle at the media-facing surface 208 as illustrated with the hidden (dashed) line. While the dimensions of the NFT 212 can vary, example dimensions for the illustrated cross-section of a peg are 60 nanometers by 25 nanometers.

Since the features of a slider assembly can be manufactured by depositing a plurality of layers, the core layer 218 is disposed in a plane parallel to a deposition substrate. While the core could be angled in any direction with respect to the media-facing surface 208, the core 218 is shown here angled in the cross-track direction such that the core is created by a combination of masking and deposition steps. Thus, as shown, the core 218, waveguide 210, and NFT 212 can be angled with respect to the media-facing surface 208 in planes parallel to each other, as well as to other slider assembly features such as write pole 214.

Figure 3:
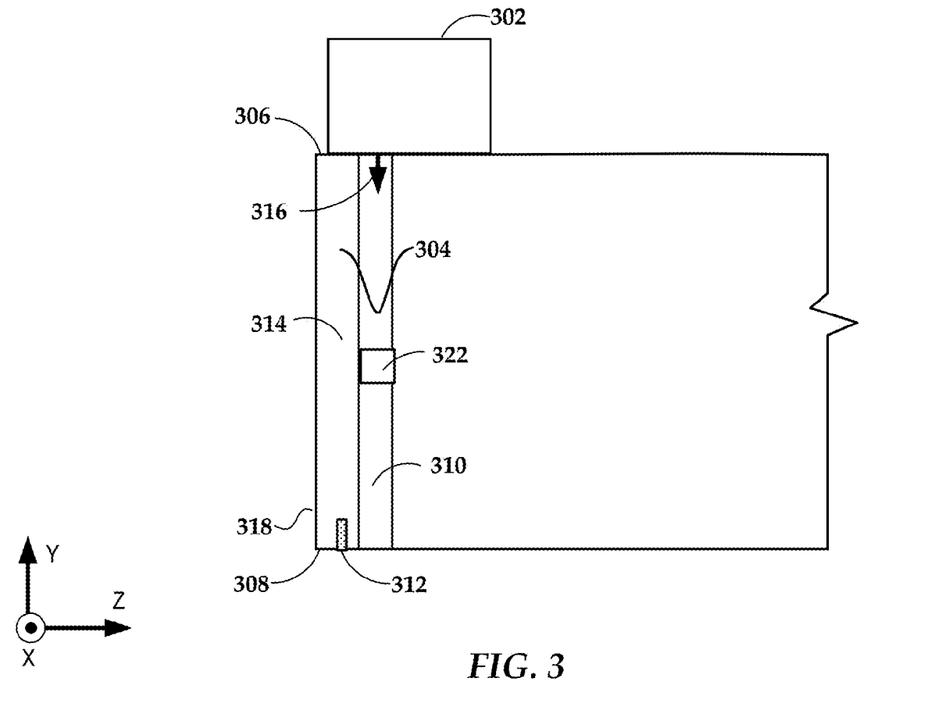
FIG. 3 is a cross-sectional view illustrating a waveguide according to an example embodiment.

In FIG. 3, a cross sectional view illustrates a waveguide 310 used with an edge-emitting laser 302 according to an example embodiment (not necessarily to scale). Generally, the laser 302 is aligned with the waveguide 310 at and/or near an input surface 306 such that the waveguide 310 is configured to receive light (arrow 316) emitted from the laser 302. A substrate 314 (or fill region) is proximate the waveguide 310 which includes high-refractive index material as discussed above. This substrate 314 (or fill region) may include a low-refractive index material. The waveguide 310 channels the light 304 from the laser 302 toward the media-facing surface 308. A mode order converter 322 converts the light 304 from a first mode to a second mode prior to the light reaching the media-facing surface. A near-field transducer 312 may be included near the media-facing (output) surface 308.

The waveguide 310 is angled in the cross-track (x-axis) direction. The waveguide can be tilted from the input surface 306 to the media-facing surface 308 (angle not visible in the illustrated cross-section) or only a portion of the waveguide may be tilted (e.g., the portion between mode order converter 322 and the media-facing surface 308). The plane of the waveguide 310 is approximately parallel to the trailing edge 318. The angle at the media-facing surface 308 can be any oblique angle relative to, and other than, normal or parallel to the media-facing surface 308. For example, the angle can be between five to fifteen degrees from normal to the media-facing surface 308. To facilitate the coupling from the laser 302 with an input waveguide coupler (not shown), the waveguide 310 at the input surface 306 is nearly normal to the input surface 306. The waveguide 310 bends slightly after the input waveguide coupler/mode order converter to form a small angle from normal to the media-facing surface 308. The degree of bending after the input waveguide coupler/mode order converter 322 to the media-facing surface 308 is small such that the first higher order waveguide mode ($TE_{10}$ mode), used for near-field transducer excitation, does not convert back into the waveguide's fundamental mode, $TE_{00}$. In order to avoid decreasing the near-field transducer efficiency substantially, the tilting angle from normal to the media-facing surface is usually smaller than 15 degrees. At these tilt angles, the amount of the $TE_{10}$ mode after reflection from a medium is much reduced, when compared with a configuration without tilting. The reflected light from a medium includes both $TE_{10}$ and $TE_{00}$ modes. However, only the $TE_{10}$ mode would eventually return into the light source, causing laser instability.

For purposes of drawing clarity, the laser 302 is shown mounted to the input surface 306, but may in practice be directly or indirectly mounted to the input surface 306. In other embodiments, the waveguide 310 and surrounding features (e.g., near-field transducer 312) may be included as a part attached to the slider body that protrudes above the top surface of the slider body, thereby facilitating optical coupling with an output of the laser 302. This embodiment may optionally include any combination of additional layers of low-refractive-index material proximate the waveguide 310, gratings on the waveguide 310, and tapers (e.g., at the media-facing surface 308).

Figure 4:
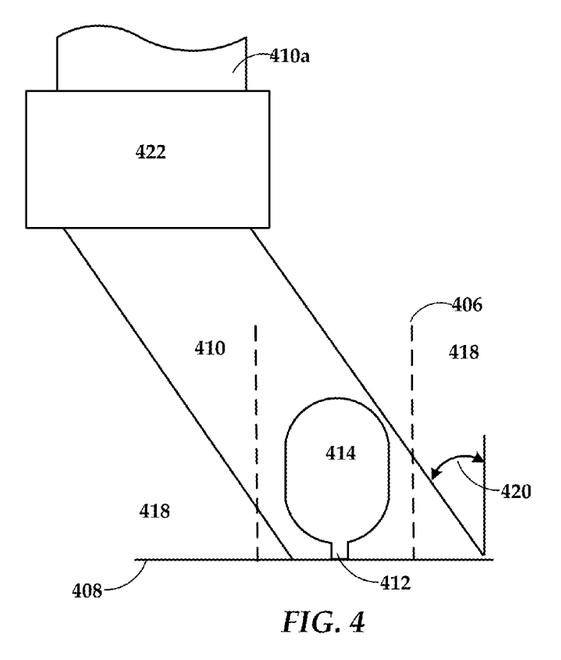
FIG. 4 is a cross-sectional view illustrating an angled waveguide with a near-field transducer according to an example embodiment.
Figure 5:
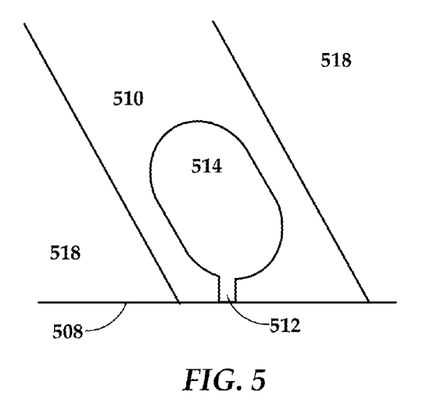
FIG. 5 is a cross-sectional view illustrating an angled waveguide with an angled expanded portion of a near-field transducer according to an example embodiment.
Figure 6:
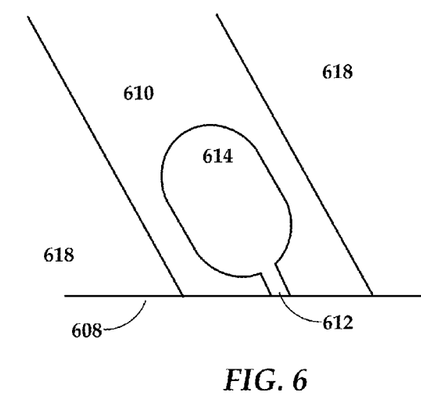
FIG. 6 is a cross-sectional view illustrating an angled waveguide with angled expanded portions and pegs of a near-field transducer according to an example embodiment.

FIGS. 4-6 illustrate the angling of various recording head features, and combinations thereof, to angle the incidence of light on recording media and thereby reduce reflection of the laser light back to the light source. FIG. 4 illustrates an embodiment where a waveguide 410 is tilted at an oblique angle 420 with respect to the media-facing surface 408. A waveguide having no tilt, or positioned at an angle normal to the media-facing surface 408, is shown superimposed on waveguide 410 with the dashed lines 406 for comparison. The portion of the waveguide 410 that is tilted may be located between the media-facing surface 408 and a mode order converter 422. The portion of the waveguide 410a prior to the mode order converter 422 (between the light source and the mode order converter 422) may be positioned at an angle approximately normal to the media-facing surface 408 and a light input surface (not shown). The waveguide includes cladding layers 418 and is positioned proximate an NFT having a peg 412 and an expanded portion 414. The NFT portions 412, 414 are both maintained at an angle approximately normal to the media-facing surface 408.

FIG. 5 illustrates an alternative embodiment where both a waveguide 510 and an expanded portion 514 of an NFT are tilted at an oblique angle with respect to the media-facing surface 508. The waveguide 510 and the expanded portion 514 can be tilted at the same, or differing, oblique angles with respect to the media-facing surface 508. The waveguide includes cladding layers 518 and is positioned proximate the NFT. The NFT also includes a peg 512 that is not tilted—maintained at an angle approximately normal to the media-facing surface 508. It should be noted that the NFT can take a variety of shapes in each of the described embodiments. For example, while the expanded portions are shown as elongated disks, the expanded portion can be shaped as a circular disk, funnel, square plate, or any other suitable shape.

FIG. 6 illustrates another alternative embodiment where each of a waveguide 610, an expanded portion 614 and a peg 612 of an NFT are tilted at an oblique angle with respect to the media-facing surface 608. Each of the waveguide 610, the expanded portion 614, and the peg 612 can be tilted at the same, or differing, angles with respect to the media-facing surface 608. The waveguide includes cladding layers 618 and is positioned proximate the NFT. For each of the embodiments of FIGS. 4-6, the position of the NFT peg with respect to the NFT expanded portion (in the cross-track direction) is reconfigured to improve or maintain coupling efficiency.

Figure 7A:
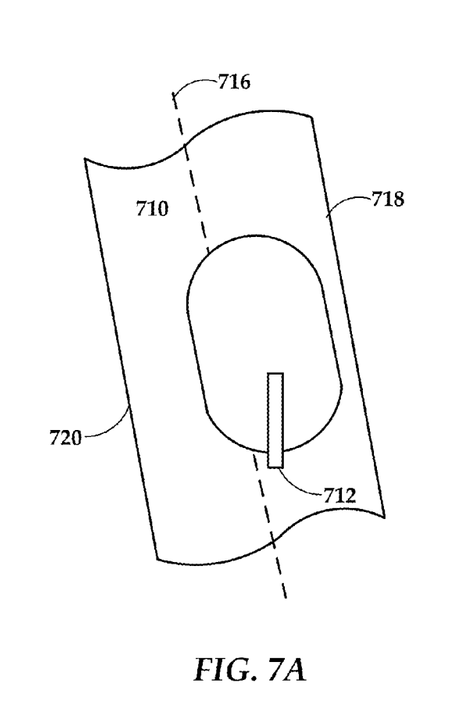
FIGS. 7A-B are cross-sectional views of a near-field transducer offset from a centerline of a waveguide core according to example embodiments.
Figure 7B:
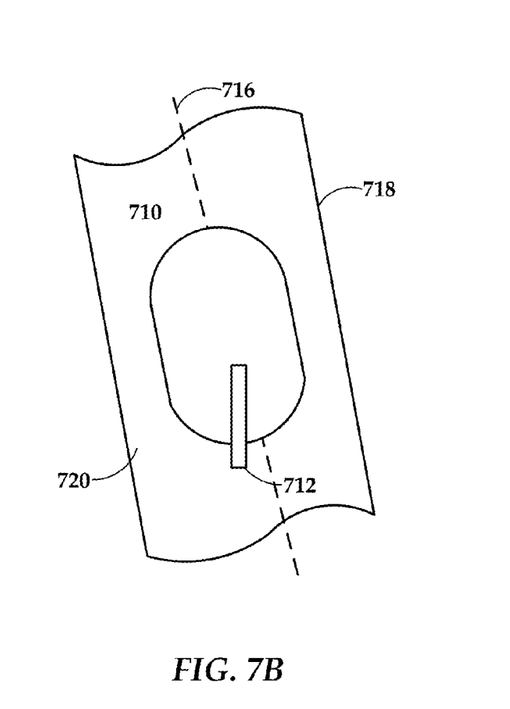

While FIGS. 4-6 illustrate the NFT approximately centered proximate the waveguide core, the NFT can also be positioned offset from the center of the waveguide core in the cross-track direction. FIGS. 7A-B illustrate a cross-track offset of an NFT with respect to the waveguide core 710. The NFT includes an expanded portion 714 and a peg 712. In FIG. 7A, both the expanded portion 714 and peg 712 are shifted in the cross-track direction away from a center line (illustrated with dashed line 716) toward waveguide core sidewall 718. However, the NFT can be shifted in either cross-track direction. Thus, FIG. 7B illustrates both the expanded portion 714 and peg 712 being shifted in the opposing cross-track direction (as compared with FIG. 7A) away from the center line 716 toward waveguide core sidewall 720. While the waveguide core 710 and expanded portion 714 are illustrated as being angled and the peg 712 is not, the offset positioning can be applied to any of the embodiments discussed above, e.g., those of FIGS. 4-6.

Figure 8A:
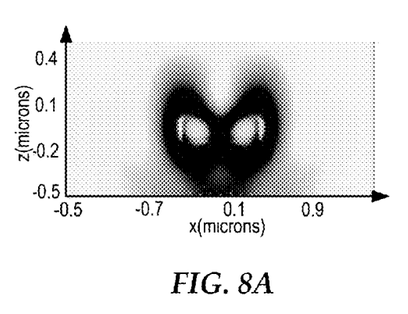
FIGS. 8A-D are graphs illustrating field distribution of reflected power for the waveguide arrangement of FIG. 5 at varying angles.
Figure 8B:
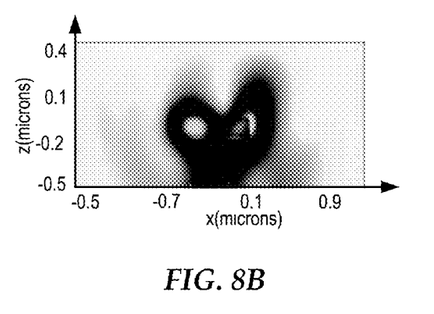
Figure 8C:
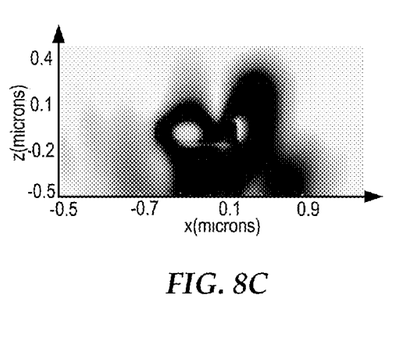
Figure 8D:
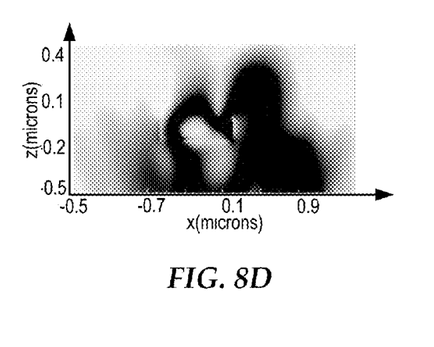

FIGS. 8A-D illustrate the field distribution in the x- and z-directions of reflected light for various tilt angles for a waveguide and an expanded portion of an NFT (e.g., the geometry illustrated in FIG. 5). FIG. 8A illustrates the reflected light at a tilt angle of zero (non-tilted, or at an angle normal to the media-facing surface); FIG. 8B illustrates the reflected light at an angle of five degrees; FIG. 8C illustrates the reflected light at an angle of ten degrees; and FIG. 8D illustrates the reflected light at an angle of fifteen degrees. For each of these distributions, the waveguide and the expanded portion of the NFT are angled at the same angle (e.g., five degrees in FIG. 8B). The reflected light in $TE_{00}$ and $TE_{10}$ mode is summarized in the Table 1 below.

TABLE 1

| Reflection | Original (0 degrees) | 5 degrees | 10 degrees | 15 degrees |
|---|---|---|---|---|
| $TE_{00}$ | 0.5% | 0.8% | 2.4% | 2.9% |
| $TE_{10}$ | 7.4% | 4.4% | 1.1% | 0.8% |
| Total Reflection | 7.9% | 5.2% | 3.5% | 3.7% |
| $TE_{10}/TE_{00}$ | 15 | 5.5 | 0.46 | 0.32 |
| Coupling Efficiency | 1.2 | 1.1 | 0.09 | 0.07 |

As shown, angling features of the recording head (e.g., the waveguide and expanded NFT portion) reduces the total reflection with each increase in tilt angle. Angling the waveguide and expanded NFT portion can reduce the $TE_{10}$ mode light reflected back to the light source from 7.4% to 0.8% (e.g., by angling the features at 15 degrees from normal to the media-facing surface in the cross-track direction). Thus, tilting these features of the recording head can dramatically reduce $TE_{10}$ mode power (e.g., angling of ten degrees results in ~1/7 of the original reflected power). Using a small degree of tilt (e.g., 15 degrees or less from normal) greatly reduces the $TE_{10}$ mode in the light reflected back, even though the total reflection ($TE_{00}$ mode plus $TE_{10}$ mode) is only modestly reduced. In embodiments with a light path configuration including a mode order converter, only the $TE_{10}$ mode will reflect back to the light source thereby causing laser instability. However, tilting the waveguide at the media-facing surface also reduces near-field transducer efficiency. For example, at a tilt angle of ten degrees, the near-field transducer efficiency is reduced by 25%. Thus, the tilt angle is kept small, e.g., ≤10 degrees.

Figure 9A:
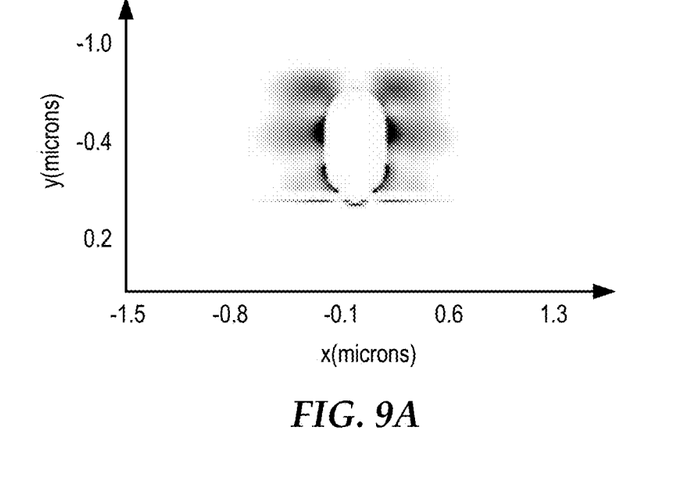
FIGS. 9A-B are graphs illustrating coupling efficiency for an angled waveguide based on positioning of the peg portion of a near-field transducer.
Figure 9B:
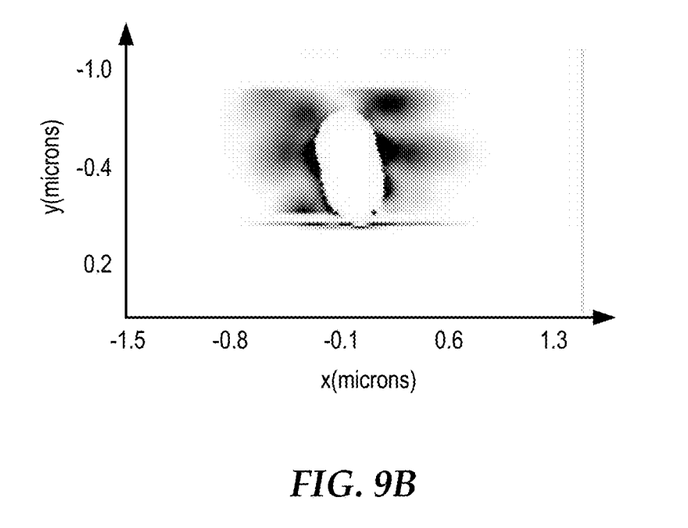

The coupling efficiency loss can be managed within 10% by repositioning the NFT peg location in the cross-track direction with respect to the angled features. This can be seen in FIGS. 9A-9B, which shows field distribution for respective angled and non-angled NFT, viewed from a substrate-parallel plane (xy-plane). As seen in FIG. 9B, for a ten degree angling of the waveguide and expanded portion of the NFT, coupling efficiency can go up to 1.1% by moving the peg of the NFT twenty nanometers. While the peg is relocated in this embodiment, the peg is not tilted. Further matching between the shape of the expanded portion and the laser mode can improve the coupling efficiency.

Figure 10:
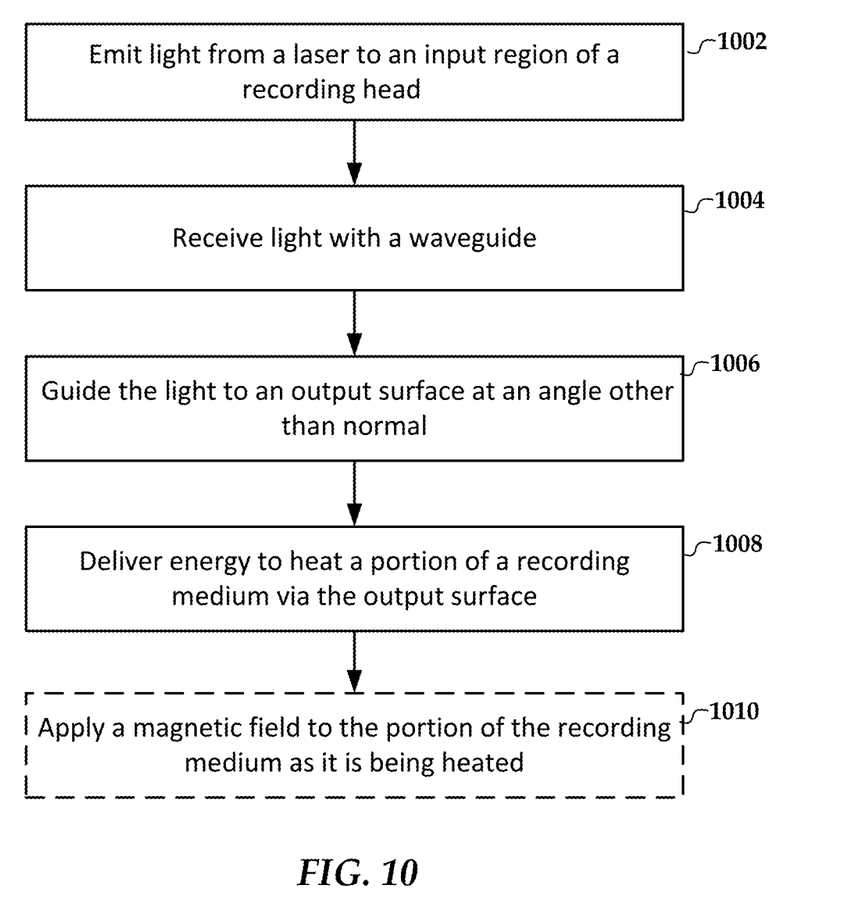
FIG. 10 is a flowchart illustrating a method according to an example embodiment.

In reference now to FIG. 10, a flowchart illustrates a method according to an example embodiment. The method involves emitting 1002 light from a laser to an input surface of an input region of a recording head. The input surface is substantially parallel to a media-facing surface, and the light may be (although is not required to be) emitted normal to the input surface. In response to emitting 1002 the light, the light is received 1004 with a waveguide. The waveguide guides the light to an output surface at an angle other than normal 1006 as the waveguide is disposed at an angle other than normal to the output surface at the output surface. The waveguide may also be disposed at an angle other than normal to the input surface at the input surface. Energy is then delivered 1008 to heat a portion of a recording medium via the output surface. Optionally, a magnetic field may be applied 1010 to the portion of the recording medium as it is being heated. In this way, the magnetic field records data to the recording medium.

The above method can further include guiding the light via the waveguide to a near-field transducer proximate the output surface. The near-field transducer generates at least a portion of the energy delivered to the recording medium. The near-field transducer includes an expanded portion and a peg. The method can be implemented with the expanded portion and/or the peg of the near-field transducer being disposed at an oblique angle with respect to the output surface. The angles of the expanded portions and/or pegs and the waveguide can be substantially the same. For example, each of the angled components can be disposed at an angle of 5, 10, or 15 degrees from a position normal to the output surface. The angle of the waveguide may be selected so as to reduce reflection of light back to the laser from the recording medium and other components proximate the output surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
    an input region comprising an input surface configured to receive energy emitted from an energy source in a first mode;
    a mode order converter configured to convert the energy from the first mode to a second mode;
    a waveguide comprising top and bottom cladding layers and a core disposed on a substrate-parallel plane therebetween, an input end disposed proximate the input surface and configured to receive the energy in the first mode, and an output end disposed proximate a media-facing surface and configured to deliver energy in the second mode, the output end being at a first oblique angle to a cross-track line at an intersection of the media-facing surface and the substrate-parallel plane; and
    a near-field transducer located proximate the core and proximate the media-facing surface.

2. The apparatus of claim 1, wherein the near-field transducer comprises an expanded portion and a peg and the expanded portion is disposed at a second oblique angle to a cross-track line at an intersection of the media-facing surface and the substrate-parallel plane.

3. The apparatus of claim 2, wherein the first and second oblique angles are substantially the same.

4. The apparatus of claim 2, wherein the peg is disposed at a third oblique angle to a cross-track line at an intersection of the media-facing surface and the substrate-parallel plane.

5. The apparatus of claim 4, wherein the first, second, and third oblique angles are substantially the same.

6. The apparatus of claim 1, wherein the first oblique angle is in a range of about 5 degrees to about 15 degrees from a position normal to the media-facing surface.

7. The apparatus of claim 2, wherein the second oblique angle is in a range of about 5 degrees to about 15 degrees from a position normal to the media-facing surface.

8. The apparatus of claim 5, wherein the first, second, and third oblique angles are in a range of about 5 degrees to about 15 degrees from a position normal to the media-facing surface.

9. The apparatus of claim 2, wherein the peg is positioned proximate the expanded portion based on the oblique angle of the output end.

10. The apparatus of claim 1, wherein the near-field transducer is disposed offset in a cross-track direction from a center line of the waveguide core.

11. An apparatus comprising:
    an input region comprising an input surface configured to receive energy emitted from an energy source in a first mode;
    an output surface configured to deliver energy to a recording medium;
    a mode order converter disposed between the input surface and the output surface and configured to convert the energy from the first mode to a second mode;
    a waveguide comprising top and bottom cladding layers and a core disposed on a substrate-parallel plane therebetween, an input end disposed proximate the input surface and configured to receive the energy in the first mode, and an output end disposed proximate the output surface and configured to deliver energy in the second mode, the output end being at an oblique angle to a cross-track line at an intersection of the output surface and the substrate-parallel plane between the output surface and the mode converter; and
    a near-field transducer proximate the core and proximate the output surface including an expanded portion and a peg, the near-field transducer being configured to receive energy in the second mode from the output end where the expanded portion is disposed at an oblique angle to a cross-track line at an intersection of the output surface and the substrate-parallel plane.

12. The apparatus of claim 11, wherein the output end angle and the expanded portion angle are substantially the same.

13. The apparatus of claim 11, wherein the output end angle is in a range of about 5 degrees to about 15 degrees from a position normal to the output surface.

14. The apparatus of claim 11, wherein the near-field transducer is disposed offset in a cross-track direction from a center line of the waveguide core.

15. The apparatus of claim 12, wherein the peg is disposed at an oblique angle to a cross-track line at an intersection of the output surface and the substrate-parallel plane.

16. The apparatus of claim 11, wherein the peg is positioned proximate the expanded portion based on the output end angle.

17. A method comprising:
    emitting light in a first mode from a laser to an input surface of an input region of a recording head;
    receiving the light in the first mode with a first portion of a waveguide;
    converting the light in the waveguide from the first mode to a second mode;
    guiding the light in the second mode to an output surface of the recording head via a second portion of the waveguide at an angle other than normal, the second portion of the waveguide being disposed at an oblique angle to a cross-track line at an intersection of the output surface and a substrate-parallel plane between the output surface and the mode converter; and delivering energy to heat a portion of a recording medium via the output surface.

18. The method of claim 17, further comprising guiding the light via the second portion to a near-field transducer proximate the output surface and configured to generate the energy, the near-field transducer including an expanded portion and a peg, the expanded portion being disposed at an oblique angle to a cross-track line at an intersection of the output surface and a substrate-parallel plane.

19. The method of claim 18, wherein the peg is disposed at an oblique angle to a cross-track line at an intersection of the output surface and a substrate-parallel plane.

20. The method of claim 18, wherein the peg is positioned proximate the expanded portion based on the oblique angle of the waveguide.

* * * * *